United States Patent
Zimmerman et al.

(10) Patent No.: US 7,046,911 B2
(45) Date of Patent: May 16, 2006

(54) SYSTEM AND METHOD FOR REDUCED PLAYBACK OF RECORDED VIDEO BASED ON VIDEO SEGMENT PRIORITY

(75) Inventors: John Zimmerman, Ossining, NY (US); Nevenka Dimitrova, Yorktown Heights, NY (US); Lekshmy Parameswaran, New York City, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1186 days.

(21) Appl. No.: 09/967,884

(22) Filed: Sep. 29, 2001

(65) Prior Publication Data

US 2003/0063407 A1    Apr. 3, 2003

(51) Int. Cl.
*H04N 5/91* (2006.01)

(52) U.S. Cl. .............................. 386/68; 386/69; 386/105

(58) Field of Classification Search ................... 386/68, 386/69, 105, 111–112
See application file for complete search history.

(56) References Cited

U.S. PATENT DOCUMENTS

| | | | | |
|---|---|---|---|---|
| 5,937,136 A | * | 8/1999 | Sato | 386/52 |
| 6,014,494 A | * | 1/2000 | Minechika et al. | 386/81 |
| 6,909,837 B1 | * | 6/2005 | Unger | 386/68 |

* cited by examiner

*Primary Examiner*—Robert Chevalier
*Assistant Examiner*—Helen Shibru (57) ABSTRACT

There is disclosed a video playback device for playing back a recorded television program in time-compressed mode on a display screen coupled to the video playback device. The video playback device comprises: 1) a disk storage system for storing the recorded television program as a plurality of audio-video segments; and 2) a fast playback controller for determining a limited time period during which the recorded television program must be played back and further capable of using at least one priority value associated with each of the plurality of audio-video segments to identify selected ones of the plurality of audio-video segments capable of being sequentially played-back during the limited time period.

29 Claims, 5 Drawing Sheets

SYSTEM AND METHOD FOR REDUCED PLAYBACK OF RECORDED VIDEO BASED ON VIDEO SEGMENT PRIORITY

TECHNICAL FIELD OF THE INVENTION

The present invention is directed, in general, to video playback devices and, more specifically, to a system for playing back a recorded television program based on priority values assigned to segments of the recorded television program.

BACKGROUND OF THE INVENTION

A wide variety of video playback devices are available in the marketplace. Most people own, or are familiar with, a video cassette recorder (VCR), also referred to as a video tape recorder (VTR). More recently, video recorders that use computer magnetic hard disks rather than magnetic cassette tapes to store television programs have appeared in the market. For example, the ReplayTV™ recorder and the TiVO™ recorder digitally record television programs on hard disk drives using, for example, MPEG-2 compression. Additionally, some video playback devices may record on a readable/writable digital versatile disk (DVD) rather than a magnetic disk.

Virtually all the systems that are capable of playing back video programs have a Fast Forward feature. A viewer often does not have time to watch an entire recorded television program at normal speed. The Fast Forward (FF) command allows a viewer to speed through the recorded program by skipping parts that are of little importance to the viewer. However, speed-viewing a recorded video program by repeatedly pressing the FF button on the remote control forces the viewer to focus his or her attention on the recorded program as it is played back. This makes it more difficult for the viewer to engage in some other task (e.g., cooking, homework, paying bills) while casually watching and fast-forwarding through a recorded television program.

Therefore, there is a need in the art for an improved video playback device that enables a viewer to casually watch and fast-forward through a recorded television program. In particular, there is a need for a video playback device that can fast-forward (or skip) through unimportant portions of a recorded television program without viewer intervention. More particularly, there is a need for a video playback device that can select important portions of a recorded television program for playback within a limited time frame determined by the viewer.

SUMMARY OF THE INVENTION

To address the above-discussed deficiencies of the prior art, it is a primary object of the present invention to provide, for use in a video playback device capable of playing back a recorded television program in time-compressed mode on a display screen coupled to the video playback device. According to an advantageous embodiment of the present invention, the video playback device comprises: 1) a disk storage system capable of storing the recorded television program as a plurality of audio-video segments; and 2) a fast playback controller capable of determining a limited time period during which the recorded television program must be played back and further capable of using at least one priority value associated with each of the plurality of audio-video segments to identify selected ones of the plurality of audio-video segments capable of being sequentially played-back during the limited time period.

According to one embodiment of the present invention, the fast playback controller determines the limited time period from input data received from a viewer.

According to another embodiment of the present invention, the fast playback controller further comprises a graphical user interface capable of receiving the input data from the viewer.

According to still another embodiment of the present invention, the fast playback controller is capable of determining a time duration associated with each of the plurality of audio-video segments.

According to yet another embodiment of the present invention, the selected ones of the plurality of audio-video segments identified by the fast playback controller have relatively high priority levels.

According to a further embodiment of the present invention, it the fast playback controller further comprises a segment prioritization controller capable of analyzing the plurality of audio-video segments and determining a priority value to each of the plurality of audio-video segments.

According to a still further embodiment of the present invention, the segment prioritization controller determines the priority value for each audio-video segment based on video content of each audio-video segment.

According to a yet further embodiment of the present invention, the segment prioritization controller determines the priority value for each audio-video segment based on audio content of each audio-video segment.

According to a yet further embodiment of the present invention, the segment prioritization controller determines the priority value for each audio-video segment based on transcript content of each audio-video segment.

In one embodiment of the present invention, the segment prioritization controller determines the priority value for the each audio-video segment as the recorded television program is being stored on the disk storage system.

In another embodiment of the present invention, the segment prioritization controller determines the priority value for the each audio-video segment after the recorded television program has been stored on the disk storage system.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. In particular, a controller may comprise one or more data processors, and associated input/output devices and memory, that execute one or more application programs and/or an operating system program. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged video playback device.

Figure 1:
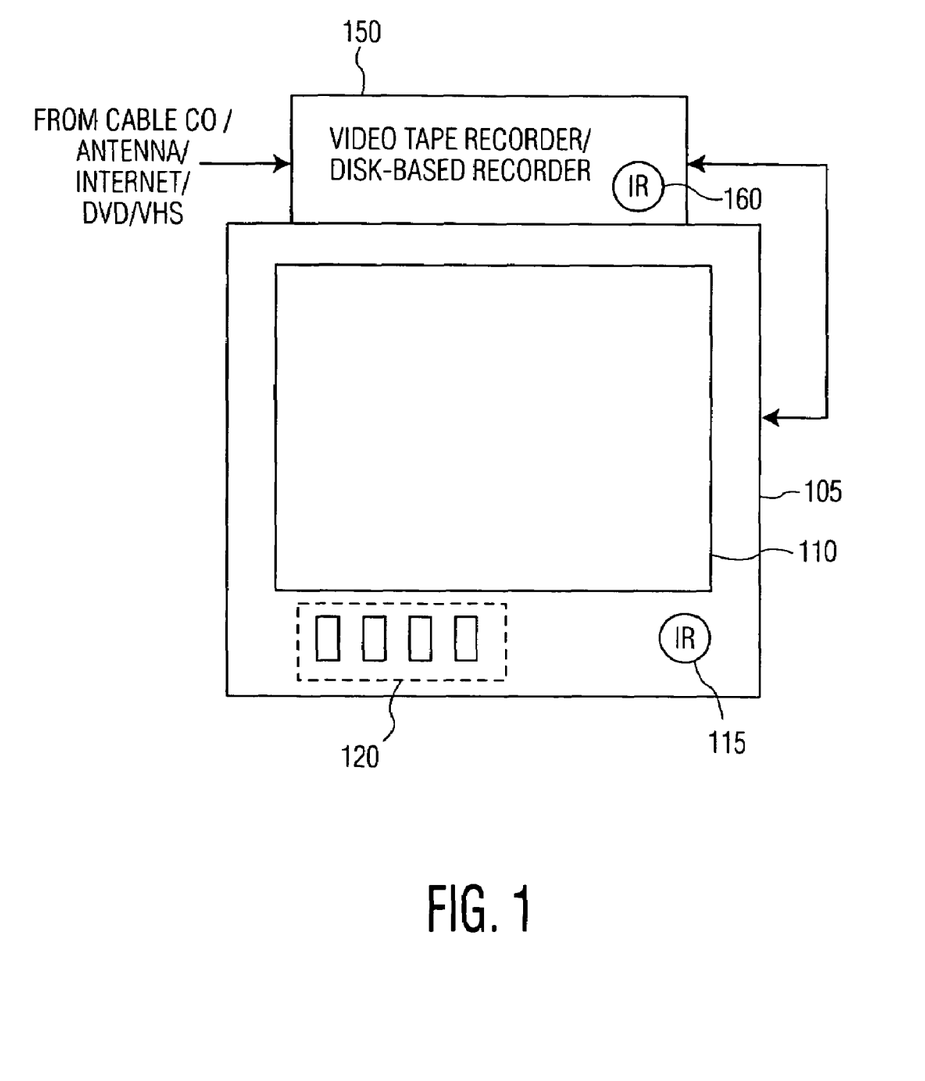
FIG. 1 illustrates an exemplary video playback device and a television set according to one embodiment of the present invention.

FIG. 1 illustrates exemplary video playback device 150 and television set 105 according to one embodiment of the present invention. Video playback device 150 receives incoming television signals from an external source, such as a cable television service provider (Cable Co.), a local antenna, the Internet, or a DVD or VHS tape player, and transmits a viewer-selected channel to television set 105. In RECORD mode, video playback device 150 may demodulate an incoming radio frequency (RF) television signal to produce a baseband video signal that is recorded and stored on a storage medium within or connected to video playback device 150. In PLAY mode, video playback device 150 reads a stored baseband video signal (i.e., program) selected by the user from the storage medium and transmits it to television set 105.

For example, if video playback device 150 is a disk drive-based device, such as a ReplayTV™ recorder or a TiVO™ recorder, video playback device 150 stores and retrieves the incoming television signals to and from a computer magnetic hard disk (rather than a magnetic cassette tape). In still other embodiments, video playback device 150 may store and retrieve from a local read/write (R/W) digital versatile disk (DVD) or R/W CD-ROM. Thus, the local storage medium may be fixed (i.e., hard disk drive) or removable (i.e., DVD, CD-ROM).

Video playback device 150 comprises infrared (IR) sensor 160 that receives commands (such as Channel Up, Channel Down, Volume Up, Volume Down, Record, Play, Fast Forward (FF), Reverse, and the like) from a remote control device operated by the viewer. Television set 105 is a conventional television comprising screen 110, infrared (IR) sensor 115, and one or more manual controls 120 (indicated by a dotted line). IR sensor 115 also receives commands (such as volume up, volume down, power ON/OFF) from a remote control device operated by the viewer.

It should be noted that video playback device 150 is not limited to receiving a particular type of incoming television signal from a particular type of source. As noted above, the external source may be a cable service provider, a conventional RF broadcast antenna, a satellite dish, an Internet connection, or another local storage device, such as a DVD player or a VHS tape player. Thus, the incoming signal may be a digital signal, an analog signal, or Internet protocol (IP) packets.

However, for the purposes of simplicity and clarity in explaining the principles of the present invention, the descriptions that follow shall generally be directed to an embodiment in which video playback device 150 receives incoming television signals (analog and/or digital) from a cable service provider. Nonetheless, those skilled in the art will understand that the principles of the present invention may readily be adapted for use with wireless broadcast television signals, local storage systems, an incoming stream of IP packets containing MPEG data, and the like.

Figure 2:
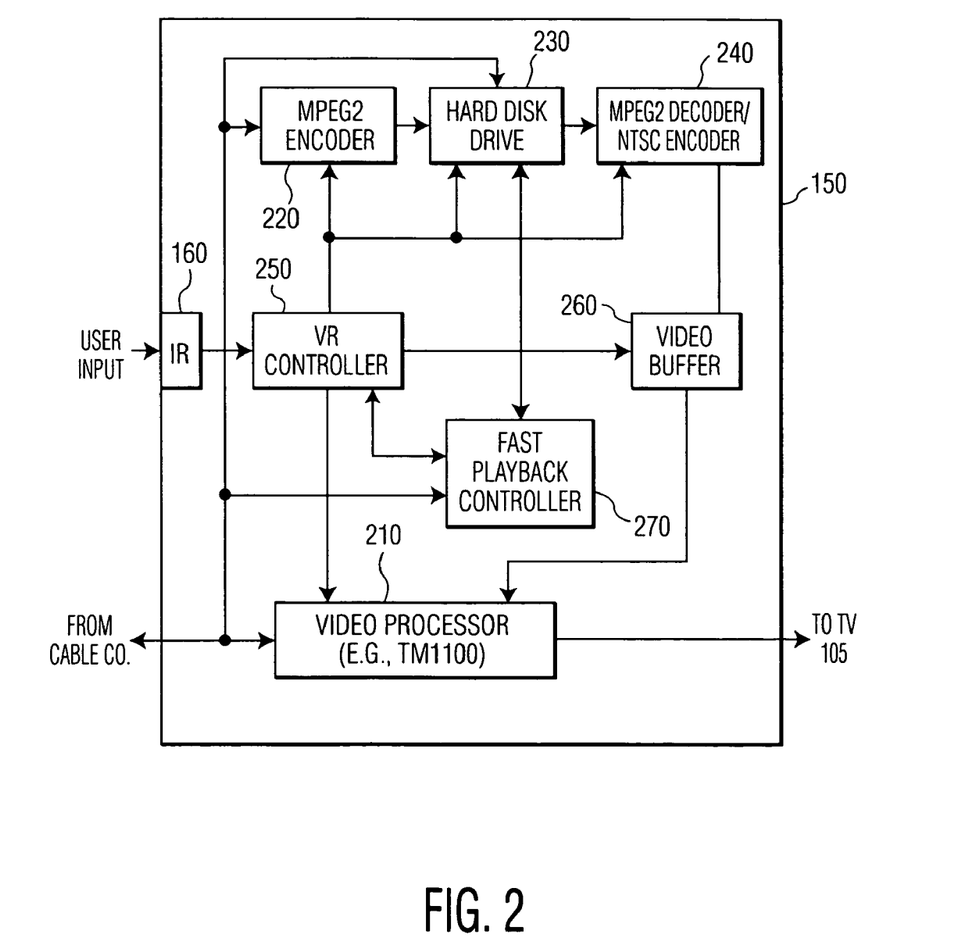
FIG. 2 illustrates in greater detail the exemplary video playback device according to one embodiment of the present invention.

FIG. 2 illustrates exemplary video playback device 150 in greater detail according to one embodiment of the present invention. Video playback device 150 comprises IR sensor 160, video processor 210, MPEG2 encoder 220, hard disk drive 230, MPEG2 decoder/NTSC encoder 240, video recorder (VR) controller 250, video buffer 260, and fast playback controller 270. VR controller 250 directs the overall operation of video playback device 150, including View mode, Record mode, Play mode, conventional Fast Forward (FF) mode, Reverse mode, among others.

In View mode, VR controller 250 causes the incoming television signal from the cable service provider to be demodulated and processed by video processor 210 and transmitted to television set 105, without storing or retrieving from hard disk drive 230. Video processor 210, which may be, for example, a TriMedia (TM) 1100 media processor, contains radio frequency (RF) front-end circuitry for receiving incoming television signals from the cable service provider, tuning to a user-selected channel, and converting the selected RF signal to a baseband television signal (e.g., super video signal) suitable for display on television set 105. Video processor 210 also is capable of receiving a conventional NTSC signal from MPEG2 decoder/NTSC encoder 240 (after buffering in video buffer 260) during Play mode and transmitting baseband television signal (e.g., super video signal) to television set 105.

In Record mode, VR controller 250 causes the incoming television signal to be stored on hard disk drive 230. Under the control of VR controller 250, MPEG2 encoder 220 receives the incoming television signal from the cable service provider and converts the received RF signal to MPEG-2 format for storage on hard disk drive 230. Alternatively, if video playback device 150 is coupled to a source that is transmitting MPEG-2 data, the incoming MPEG-2 data may bypass MPEG2 encoder 220 and be stored directly on hard disk drive 230. In Play mode, VR controller 250 directs hard disk drive 230 to stream the stored television signal (i.e., program) to MPEG2 decoder/NTSC encoder 240, which converts the MPEG2 data from hard disk drive 230 to, for example, a super video (S-Video) signal that is buffered in video buffer 260 before video processor 210 transmits it to television set 105.

It should be noted that the choice of the MPEG2 standard for MPEG2 encoder 220 and MPEG2 decoder/NTSC encoder 240 is by way of illustration only. In alternate embodiments of the present invention, the MPEG encoder and decoder may comply with one or more of the MPEG-1, MPEG-2, MPEG-4, and MPEG-7 standards.

For the purposes of this application and the claims that follow, hard disk drive 230 is defined to include any mass storage device that is both readable and writable, including conventional magnetic disk drives and optical disk drives for read/write digital versatile disks (DVD-RW), re-writable CD-ROMs, VCR tapes and the like. In fact, hard disk drive 230 need not be fixed in the conventional sense that is permanently embedded in video playback device 150. Rather, hard disk drive 230 includes any mass storage device that is dedicated to video playback device 150 for the purpose of storing recorded video programs. Thus, hard disk drive 230 may include an attached peripheral drive or removable disk drives (whether embedded or attached), such as a juke box device that holds read/write DVDs or re-writable CD-ROMs. Furthermore, in an advantageous embodiment of the present invention, hard disk drive 230 may include external mass storage devices that video playback device 150 may access and control via a network connection (e.g., Internet protocol (IP) connection), including, for example, a disk drive in the user's home personal computer (PC) or a disk drive on a server at the user's Internet service provider (ISP).

During Play mode, VR controller 250 may receive a Fast Playback (FP) command from a viewer via IR sensor 160. According to the principles of the present invention, VR controller 250 signals fast playback controller 270 that FP mode has been selected and, in response, fast playback controller 270 causes hard disk drive to transmit only selected segments of a recorded television program to MPEG2 decoder/NTSC encoder 240 according to the priority level of the selected segments and a viewer-determined playback time period. Fast playback controller 270 selects as many of the highest priority segments as possible that can be played back in the viewer-determined playback time period and causes the selected high-priority segments to be played back sequentially. Thus, video playback device 150 allows only the portions of a recorded television program that are of interest to the viewer to be played back during the playback time period.

The present invention allows a viewer to compress his or her viewing time. Video playback device 150 segments a television program into a plurality of segments and then assigns one or more priority values associated with the video content in each segment.

The user may input to video playback device 150 (via a graphical user interface, for example) the amount of time the user has and this sets a threshold for the segments. Video playback device 150 then plays back only the segments above the threshold in the order the segments were broadcast. Alternatively, the viewer may not specify a playback time, but may enter a FASTER command using a remote control. In response, video playback device 150 may increase the segment priority threshold level from its current value to a higher value. This causes video playback device 150 to play back only segments having increasingly higher priority values each time the viewer enters a FASTER command.

There are a number of methods for assigning priority values to the content in each segment:
1. Implicit observation of user viewing habits;
2. Genre specific rules;
3. Content provider/creator segmentation; and
4. Teaser/trailer condensed presentation.

Implicit Observation

According to one embodiment of the present invention, video playback device 150 may assign priority to video segments by observing user/viewer behavior. Video playback device 150 monitors what types of segments the user watches and what kind of segments the user fast-forwards through. In addition, video playback device 150 may monitor what types of segments the viewer rewinds to watch again. For example: video playback device 150 might determine that the viewer watches recorded episodes of the "Late Show with David Letterman". Over time, video playback device 150 may also determine that the viewer always fast-forwards through commercials, often fast forwards through the musical performances by the Late Show band, sometimes fast-forwards through musical performances by guests, never fast-forwards through the opening monologue or the Top Ten list, and occasionally rewinds to re-watch the Top Ten list. From this viewer behavior, video playback device 150 can infer a hierarch of segments and assign priorities to each segment. When the viewer is pressed for time, video playback device 150 plays back only the higher rated segments. The threshold determining which segments get played back is modified according to the amount of time the viewer inputs to video playback device 150.

Genre Specific Rules

This method is particular appropriate for sports. For example, video playback device 150 may be pre-programmed with ratings for different kinds of segments. For football, thee priority segments may look like the following:
1. Final score;
2. Plays where the crowd noise increases;
3. Touchdowns;
4. Field goals;
5. Interceptions;
6. Play in motion;
7. Slow motion replays;
8. Huddles;
9. Time outs;
10. Half-time show; and
11. TV commercials.

A viewer can use the preset values initially, without taking the time for video playback device 150 to learn the habits of the viewer. In addition, a viewer may modify the preset priority values, personalizing them to individual tastes.

Content Provider Segmentation

A content provider could embed segment priority hierarchies within the video content. In addition, the content provider could embed different hierarchies for different viewers. For example: viewers that watch the TV show "ER" may either like the medical scenes most or like the romantic relationship scenes most. The content providers could embed ratings for both kinds of viewers, allowing each viewer to watch a condensed version of the recorded program according to the viewer's profile.

Teaser/Trailer Condensed Presentations

Video playback device 150 may receive a segment hierarchy sent by the content provider (or generated locally) that is presented in a manner similar to a movie trailer. The normal movie structure contains an introduction, an exposition, tension buildup and a conflict resolution. Video playback device 150 may first present the highest priority segments that correspond to introduction and tension buildup and, after a time, a slanted version of the conflict resolution.

Figure 3:
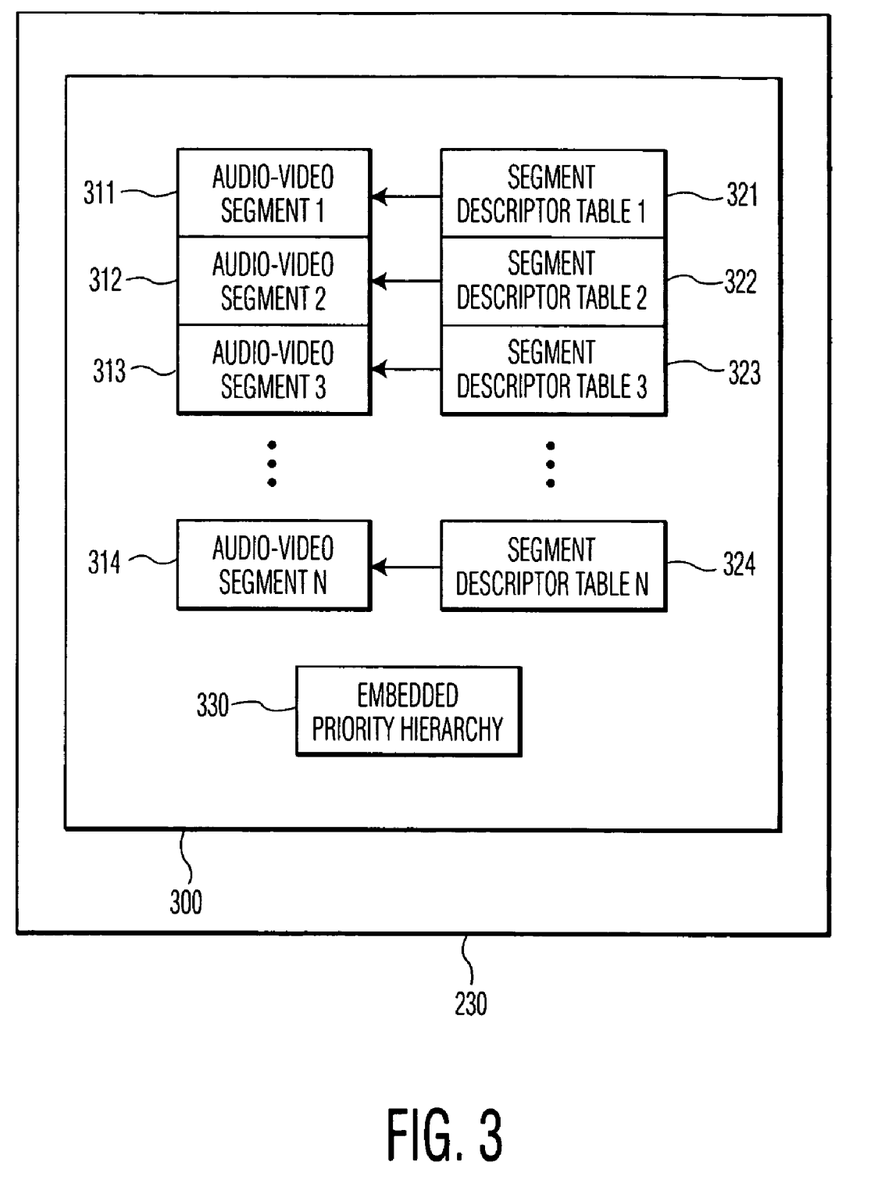
FIG. 3 illustrates a recorded television program stored on the hard disk drive in the exemplary video playback device according to one embodiment of the present invention.

FIG. 3 illustrates exemplary recorded television program 300 stored on hard disk drive 230 according to one embodiment of the present invention. Television program 300 comprises audio and video data packets stored in up to N audio-video segments, including exemplary audio-video segment 311, audio-video segment 312, audio-video segment 313, and audio-video segment 314, which are sequentially labeled Audio-Video Segment 1, Audio-Video Segment 2, Audio-Video Segment 3, and Audio-Video Segment N, respectively. Television program 300 also comprises content descriptor data stored in up to N segment descriptor tables, including exemplary segment descriptor table 321, segment descriptor table 322, segment descriptor table 323, and segment descriptor table 314, which are sequentially labeled Segment Descriptor Table 1, Segment Descriptor Table 2, Segment Descriptor Table 3, and Segment Descriptor Table 4, respectively.

According to an advantageous embodiment of the present invention, segment descriptor tables 321–324 may be similar to descriptor tables set forth in the MPEG-7 standard. MPEG-7 descriptor tables contain descriptor data that identify certain characteristics associated with segments (or scenes) in a MPEG video file. The descriptor data may identify actors in a particular scene, objects in the scene (e.g., red car, wood desk, armchair), the producer or director of the movie or television program, subject matter of the scene (e.g., football game, news report, weather alert), and the like. Importantly, the descriptor data may include a time duration value, or start time and stop time data that allows the present invention to determine which of the highest priority segments are capable of being played back during the viewer selected playback time period.

As described below in greater detail, video playback device 150 may modify segment descriptor tables 321–324 to include one or more priority values associated with a corresponding one of audio-video segments 311–314. Thus, video playback device 150 may modify segment descriptor table 321 to contain a priority value associated with audio-video segment 311, may modify segment descriptor table 322 to contain a priority value for audio-video segment 312, and so on.

Finally, embedded priority hierarchy file 330 comprises priority level data embedded by a content provider in television program 300. Embedded priority hierarchy file 330 contains data telling video playback device 150 which segments to play back, depending on the amount of playback time specified by the viewer. Alternatively, the viewer may not specify a playback time, but may instead use the remote control to transmit a FASTER command to video playback device 150. In response to a FASTER command, video playback device 150 may increase the segment priority threshold level from a current value to a higher priority value. This causes video playback device 150 to play back only segments having increasingly higher priority values each time a FASTER command is received. As noted above, the content provider could embed different hierarchies for different viewers, allowing each viewer to watch a condensed version of television program 300 according to each viewer profile.

Figure 4:
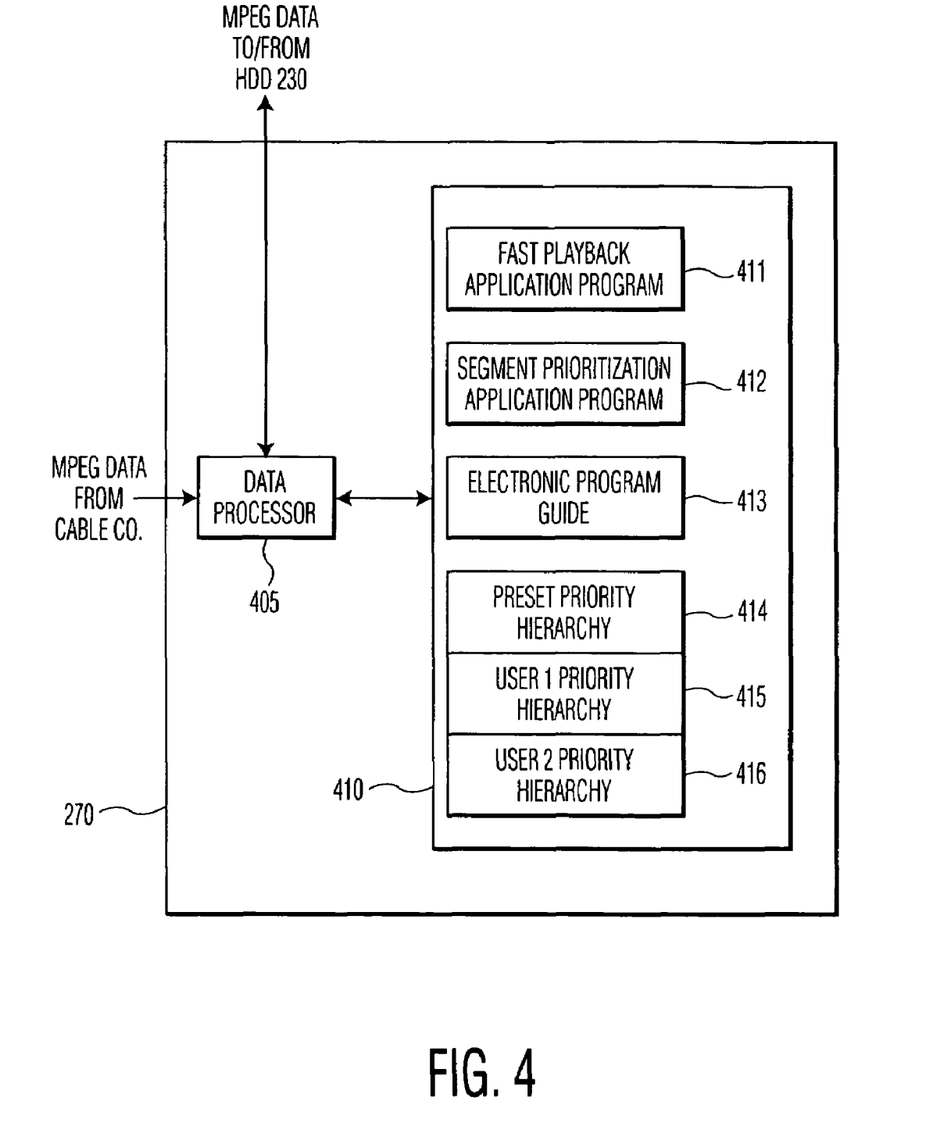
FIG. 4 illustrates an exemplary fast playback controller according to one embodiment of the present invention.

FIG. 4 illustrates exemplary fast playback controller 270 according to one embodiment of the present invention. Fast playback controller 270 comprises data processor and memory 410. Memory 410 stores fast playback application program 411, segment prioritization application program, electronic program guide 413, preset priority hierarchy file 414, user priority hierarchy 415 (labeled "User 1 Priority Hierarchy"), and user priority hierarchy 416 (labeled "User 2 Priority Hierarchy"). During the storage of an MPEG data stream on hard disk drive 230, data processor 404 analyzes the received MPEG data and executes segment prioritization application program 412. Alternatively, after an MPEG data file is stored on hard disk drive 230, data processor 404 may analyze the stored MPEG data and execute segment prioritization application program 412.

Under control of segment prioritization application program 412, data processor 404 modifies segment descriptor tables 321–324 to contain priority values for audio-video segments 311–314. To determine a priority level, segment prioritization application program 412 must first identify the content in each segment. This may be done in any one of many ways known in the art. Segment prioritization application program 412 may determine the type of content from the descriptor data inserted by the content creator in descriptor tables 321. Segment prioritization application program 412 also may make rough determinations of the content type using electronic program guide 413, which is transmitted along with the incoming MPEG data.

In still other embodiments of the present invention, segment prioritization application program 412 may use well-known, conventional video processing techniques to identify specific video audio, and transcript (e.g., closed captioned text) characteristics in the content of television program 300. Knowledge of occurrences of these specific video, audio, and/or transcript characteristics may be used to make inferences about the corresponding audio-video segments in order to determine priority values for each segment.

Segment prioritization application program 412 also compares the viewing patterns of a particular user (viewer) with the viewer priority data associated with that user stored in, for example, user priority hierarchy file 415. Thus, over a period of time, data processor 405 may use implicit observation, as described above, to update the priority level data. Preset priority hierarchy file 414 contains priority level data that is pre-programmed with initial ratings for different segment types, as described above. Segment prioritization application program 412 may use the preset values initially, without taking the time to learn the habits of the viewer. Finally, segment prioritization application program 412 may use a graphical user interface that enables a viewer to modify the preset priority values as well as the user own priority values in, for example, user priority hierarchy file 415.

During fast playback mode, data processor 405 executes fast playback application program 411, which presents the viewer with a graphical user interface that allows the viewer/user to enter the viewer's identification and to select a time period (e.g., 5 minutes, 10 minutes, 15 minutes, 30 minutes, 45 minutes, one hour, etc.). Using the viewer ID information and the playback time period, fast playback application program 411 uses the user priority level data in the appropriate one of user priority hierarchy file 415 and user priority hierarchy file 416 to identify which of the highest priority segments in recorded television program 300 can be played back within the specified time period. Fast playback application program 411 then causes hard disk drive 230 to send only the identified high priority segments to MPEG2 decoder/NTSC encoder 240.

Figure 5:
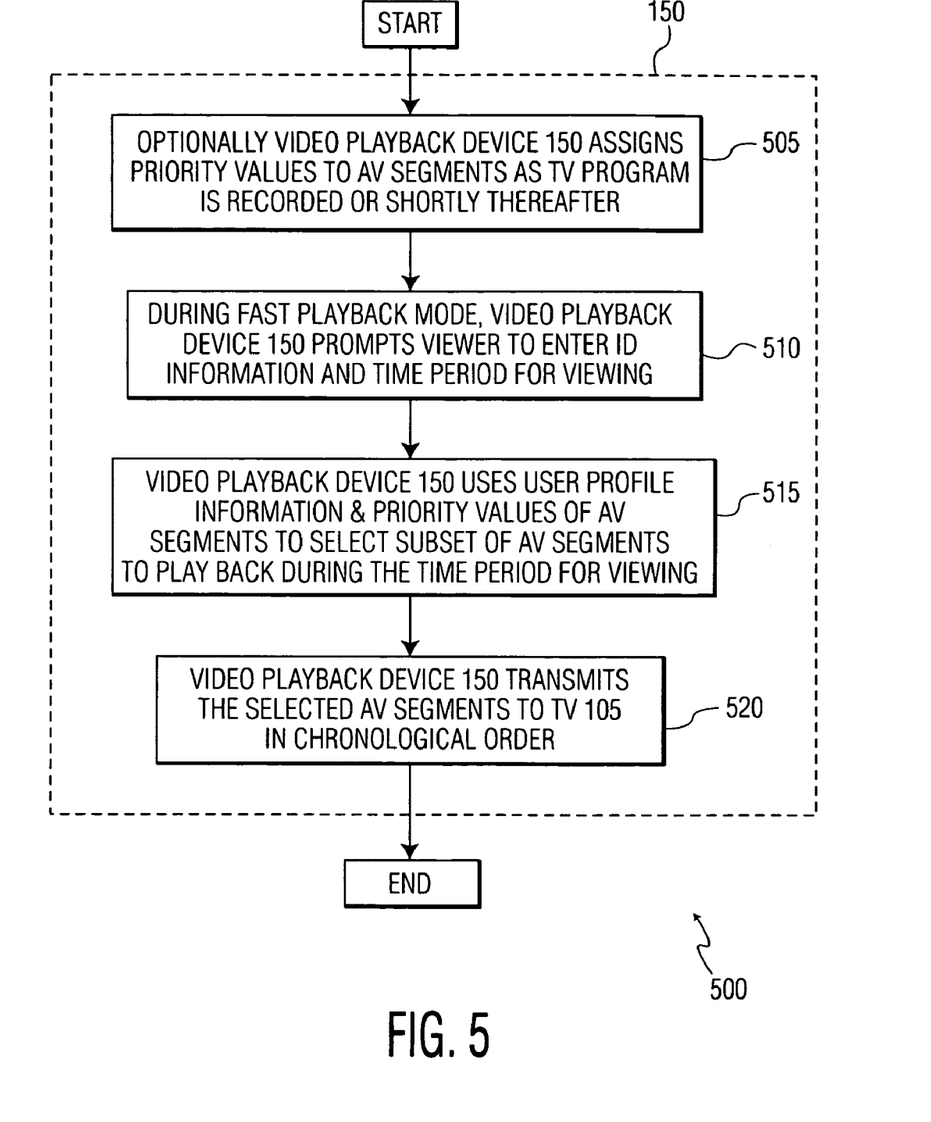
FIG. 5 is a flow diagram illustrating the operation of the exemplary video playback device according to one embodiment of the present invention.

FIG. 5 depicts flow diagram 500, which illustrates the operation of exemplary video playback device 150 according to one embodiment of the present invention. Optionally video playback device 150 assigns priority values to AV segments 311–314 as television program 300 is recorded (or shortly thereafter) (process step 505). During fast playback mode, video playback device 150 prompts viewer to enter ID information and time period for viewing (process step 510). Video playback device 150 uses user profile information and priority values of AV segments 311–314 to select a subset of AV segments 311–314 to play back during the time period for viewing (process step 515). Finally, video playback device 150 transmits the selected subset of AV segments to television set 105 in chronological order (process step 520).

Although the present invention has been described in detail, those skilled in the art should understand that they can make various changes, substitutions and alterations herein without departing from the spirit and scope of the invention in its broadest form.

What is claimed is:

1. A video playback device capable of playing back a recorded television program in time-compressed mode on a display screen coupled to said video playback device, said video playback device comprising:
   a disk storage system capable of storing said recorded television program as a plurality of audio-video segments; and
   a fast playback controller capable of determining a limited time period during which said recorded television program must be played back and further capable of using at least one priority value associated with each of said plurality of audio-video segments to identify selected ones of said plurality of audio-video segments capable of being sequentially played-back during said limited time period.

2. The video playback device as set forth in claim 1 wherein said fast playback controller determines said limited time period from Ainput data received from a viewer.

3. The video playback device as set forth in claim 2 wherein said fast playback controller further comprises a graphical user interface capable of receiving said input data from said viewer.

4. The video playback device as set forth in claim 1 wherein said fast playback controller is capable of determining a time duration associated with each of said plurality of audio-video segments.

5. The video playback device as set forth in claim 4 wherein said selected ones of said plurality of audio-video segments identified by said fast playback controller have relatively high priority levels.

6. The video playback device as set forth in claim 1 wherein said fast playback controller further comprises a segment prioritization controller capable of analyzing said plurality of audio-video segments and determining a priority value for each of said plurality of audio-video segments.

7. The video playback device as set forth in claim 6 wherein said segment prioritization controller determines said priority value for said each audio-video segment based on video content of said each audio-video segment.

8. The video playback device as set forth in claim 6 wherein said segment prioritization controller determines said priority value for said each audio-video segment based on audio content of said each audio-video segment.

9. The video playback device as set forth in claim 6 wherein said segment prioritization controller determines said priority value for said each audio-video segment based on transcript content of said each audio-video segment.

10. The video playback device as set forth in claim 6 wherein said segment prioritization controller determines said priority value for said each audio-video segment based on a viewer-specific priority profile.

11. The video playback device as set forth in claim 6 wherein said segment prioritization controller determines said priority value for said each audio-video segment as said recorded television program is being stored on said disk storage system.

12. The video playback device as set forth in claim 6 wherein said segment prioritization controller determines said priority value for said each audio-video segment after said recorded television program has been stored on said disk storage system.

13. A method of playing back a recorded television program in time-compressed mode on a display screen coupled to a video playback device, the method comprising the steps of:
   storing the recorded television program on a disk storage system as a plurality of audio-video segments; and
   determining a limited time period during which the recorded television program must be played back; and
   using at least one priority value associated with each of the plurality of audio-video segments to identify selected ones of the plurality of audio-video segments capable of being sequentially played-back during the limited time period.

14. The method as set forth in claim 13 wherein the step of determining the limited time period comprises the step of determining the limited time period from input data received from a viewer.

15. The method as set forth in claim 14 wherein the step of determining comprises the sub-step of receiving the input data from the viewer via a graphical user interface.

16. The method as set forth in claim 13 further comprising the step of determining a time duration associated with each of the plurality of audio-video segments.

17. The method as set forth in claim 16 wherein the selected identified ones of the plurality of audio-video segments have relatively high priority levels.

18. The method as set forth in claim 13 further comprising the steps of:
   analyzing the plurality of audio-video segments; and
   determining a priority value for each of the plurality of audio-video segments.

19. The method as set forth in claim 18 further comprising the sub-step of determining the priority value for each audio-video segment based on video content of each audio-video segment.

20. The method as set forth in claim 18 further comprising the sub-step of determining the priority value for each audio-video segment based on audio content of each audio-video segment.

21. The method as set forth in claim 18 further comprising the sub-step of determining the priority value for each audio-video segment based on transcript content of each audio-video segment.

22. The method as set forth in claim 18 further comprising the sub-step of determining the priority value for each audio-video segment based on a viewer-specific priority profile.

23. The method as set forth in claim 18 further comprising the sub-step of determining the priority value for each audio-video segment as the recorded television program is being stored on the disk storage system.

24. The method as set forth in claim 18 further comprising the sub-step of determining the priority value for each audio-video segment after the recorded television program has been stored on the disk storage system.

25. A video playback device capable of playing back a recorded television program in time-compressed mode on a display screen coupled to said video playback device, said video playback device comprising:
   a disk storage system capable of storing said recorded television program as a plurality of audio-video segments; and
   a fast playback controller capable of receiving from a viewer a first playback speed command and, in response thereto, further capable of selecting for playback ones of said plurality of audio-video segments based on priority values associated with said plurality of audio-video segments, wherein each of said selected audio-video segments has an associated priority value higher than a priority value corresponding to said first playback speed command.

26. The video playback device as set forth in claim 25 wherein said fast playback controller further comprises a segment prioritization controller capable of analyzing said plurality of audio-video segments and determining a priority value for each of said plurality of audio-video segments.

27. The video playback device as set forth in claim 25 wherein said segment prioritization controller determines said priority value for said each audio-video segment as said recorded television program is being stored on said disk storage system.

28. The video playback device as set forth in claim 25 wherein said segment prioritization controller determines said priority value for said each audio-video segment after said recorded television program has been stored on said disk storage system.

29. A computer readable storage medium having stored thereon a television program, said television program comprising a plurality of audio-video segments, each of said plurality of audio-video segments having at least one priority value associated therewith, wherein said at least one priority value is usable by a video playback device to which said television program is transmitted to identify selected ones of said plurality of audio-video segments capable of being sequentially played back during a viewer-determined time period.

* * * * *